United States Patent
Gaudron et al.

(10) Patent No.: US 8,444,358 B2
(45) Date of Patent: May 21, 2013

(54) WALL ANCHOR

(75) Inventors: Paul Gaudron, Stratford, CT (US); Jacob Olsen, Roselle, IL (US)

(73) Assignee: Black & Decker Inc., Newark, DE (US)

( * ) Notice: Subject to any disclaimer, the term of this patent is extended or adjusted under 35 U.S.C. 154(b) by 485 days.

(21) Appl. No.: 12/772,494

(22) Filed: May 3, 2010

(65) Prior Publication Data

US 2011/0268527 A1    Nov. 3, 2011

(51) Int. Cl.
*F16B 21/00* (2006.01)

(52) U.S. Cl.
USPC .................... 411/340; 411/60.3; 411/80.1

(58) Field of Classification Search
USPC ............. 411/29, 30, 32, 60.3, 80.1, 340, 344, 411/345
See application file for complete search history.

(56) References Cited

U.S. PATENT DOCUMENTS

| D49,704 S | 6/1916 | Cook | |
|---|---|---|---|
| D263,557 S | 3/1982 | Einhorn | |
| 4,601,625 A * | 7/1986 | Ernst et al. | 411/387.4 |
| 4,662,808 A * | 5/1987 | Camilleri | 411/340 |
| 5,037,257 A * | 8/1991 | Kubic et al. | 411/30 |
| 5,160,225 A | 11/1992 | Chern | |
| 5,224,805 A * | 7/1993 | Moretti et al. | 411/30 |
| 5,876,169 A * | 3/1999 | Wrigley | 411/344 |
| 6,250,865 B1 * | 6/2001 | McSherry | 411/344 |
| 6,382,892 B1 | 5/2002 | Hempfling | |
| 6,435,789 B2 * | 8/2002 | Gaudron | 411/344 |
| D475,410 S | 6/2003 | Huang | |
| 2005/0175429 A1 * | 8/2005 | Panasik et al. | 411/80.1 |
| 2006/0222474 A1 * | 10/2006 | Brown et al. | 411/340 |
| 2007/0224013 A1 * | 9/2007 | Panasik et al. | 411/30 |
| 2008/0199275 A1 * | 8/2008 | Brown et al. | 411/340 |
| 2009/0003962 A1 * | 1/2009 | McDuff et al. | 411/344 |

* cited by examiner

*Primary Examiner* — Roberta Delisle
(74) *Attorney, Agent, or Firm* — Scott Markow

(57) ABSTRACT

A wall anchor is provided and includes a nose cone structure including a body and a primary cone, which is rotatably coupled to the body and manually urgeable to penetrate a substrate, a detent assembly, disposed on the nose cone structure, which is engageable to maintain the primary cone in a first position and a trigger integrally coupled to the nose cone structure and actuatable to selectively disengage the detent assembly such that the primary cone is permissively rotatable about the body into a second position.

20 Claims, 2 Drawing Sheets

WALL ANCHOR

BACKGROUND OF THE INVENTION

The subject matter disclosed herein relates to wall anchors.

A wall anchor, a screw anchor or a wall plug is a fastener that can attach one object to another in situations where screws, nails, adhesives, or other simple fasteners are either impractical or ineffective. Different types of wall anchors have different levels of strength and can be used on different types of surfaces.

In an exemplary case, a wall anchor may be employed to hang a relatively heavy object onto a wall made of plaster or some other relatively weak material, such as dry wall. In these cases, the wall typically must be initially prepared (i.e., a pilot hole needs to be formed in the wall), the wall anchor must be inserted into the pilot hole and a fixture for hanging the object must be inserted into the wall anchor. This three (or more) step process can be time consuming and often requires additional tools, such as a power drill for forming the pilot hole, and some type of power source.

BRIEF DESCRIPTION OF THE INVENTION

According to an aspect of the invention, a wall anchor is provided and includes a nose cone structure including a body and a primary cone, which is rotatably coupled to the body and manually urgeable to penetrate a substrate, a detent assembly, disposed on the nose cone structure, which is engageable to maintain the primary cone in a first position and a trigger integrally coupled to the nose cone structure and actuatable to selectively disengage the detent assembly such that the primary cone is permissively rotatable about the body into a second position.

According to another aspect of the invention, a wall anchor system is provided and includes a nose cone structure including a body and a primary cone, which is rotatably coupled to the body and manually urgeable to penetrate a substrate, a detent assembly, disposed on the nose cone structure, which is engageable to maintain the primary cone in a first position and a trigger integrally coupled to the nose cone structure and actuatable to selectively disengage the detent assembly such that the primary cone is permissively rotatable into a second position and a member, which is insertable through the body to impinge upon and thereby actuate the trigger, to selectively disengage the detent assembly to thereby permit rotation of the primary cone about the body into a second position.

According to yet another aspect of the invention, a wall anchor is provided and includes a nose cone structure including a body and a primary cone, which is rotatably coupled to the body and manually urgeable to penetrate a substrate, a detent assembly, disposed on the nose cone structure, which is engageable to maintain the primary cone in a first position at which the nose cone structure applies an initial pressure onto the substrate and a trigger integrally coupled to the nose cone structure and actuatable to selectively disengage the detent assembly such that the primary cone is permissively rotatable about the body into a second position at which the nose cone structure applies an increased pressure onto the substrate.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
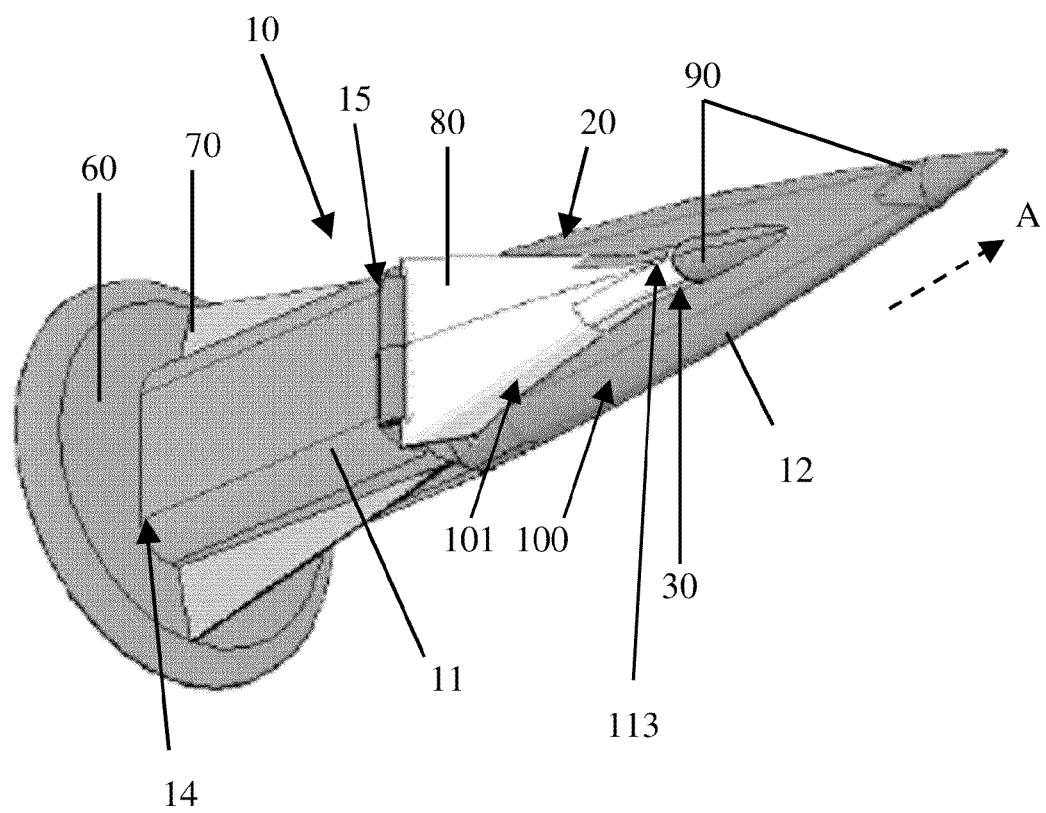
FIG. 1 is a perspective view of a wall anchor.
Figure 2:
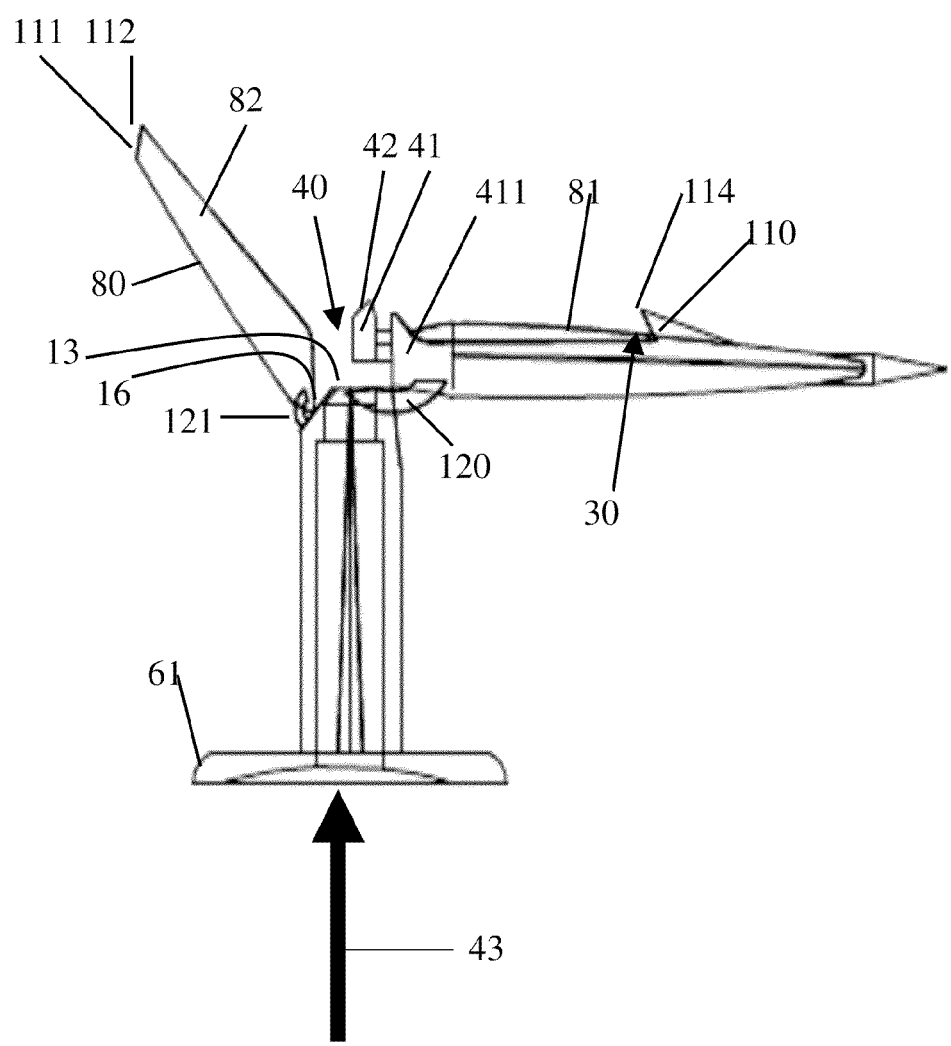
FIG. 2 is a side cutaway view of the wall anchor of FIG. 1.

With reference to FIGS. 1 and 2, a wall anchor 10 is provided and includes a nose cone structure 20, a detent assembly 30 and a trigger 40. The nose cone structure 20 includes a body 11 and a primary cone 12. The primary cone 12 is rotatably coupled to a face 13 of the body 11 and is manually urgeable by, for example, a user to at least partially penetrate a substrate in a leading position with the body 11 following.

The detent assembly 30 is disposed on the nose cone structure 20 and is engageable to thereby maintain the primary cone 12 in a first position relative to the body 11 and/or a direction A of substrate penetration. In particular, in this first position, the primary cone 12 may be substantially aligned with a longitudinal axis of the body 11, the direction A of substrate penetration or the nose cone structure 20 as a whole may apply an initial pressure onto the substrate.

The trigger 40 is integrally coupled to the nose cone structure 20 and is actuatable to selectively disengage the detent assembly 30. In some embodiments, the trigger 40 may be further actuatable to also cause a rotation of the primary cone 12 about the face 13 of the body 11 and into a second position. In the second position, which may be any one of many plural positions, the primary cone 12 is removed from body 11 or penetration direction alignment and the nose cone structure 20 may apply an increased pressure onto the substrate.

The nose cone structure 20 is tapered from a trailing end 14 to a leading end 15. The taper is characterized in that the nose cone structure 20 has a relatively wide trailing end 14 and a relatively narrow and, in some cases, pointed leading end 15 and may be generally smooth and/or irregular. The taper facilitates the manual urging of the wall anchor 10 through the substrate.

The body 11 includes a flange 60, the first face 13 and a second face 16. The flange 60 is disposed at the trailing end 14 and may abut the substrate at or near a conclusion of substrate penetration to inhibit further movement of the body 11 in the direction A. The first face 13 and the second face 16 are transversely oriented with respect to one another and disposed at the leading end 15. The primary cone 12 is rotatably coupled to the first face 13.

The flange 60 may include a rounded edge 61. The rounded edge 61 facilitates the manual urging of the body 11 and may form a shallow depression in a surface of the substrate upon substrate penetration. This depression may allow the wall anchor 10 to abut the substrate in a flush manner such that a relatively smooth substrate surface is maintained.

The nose cone structure 20 may have a substantially oblong cross section at multiple axial positions thereof. The nose cone structure 20 is therefore resistant to rotation about a longitudinal axis thereof. This resistance may be increased by the inclusion of wings 70 disposed on at least the body 11, which may engage with material of the substrate to prevent rotation about the longitudinal axis.

The nose cone structure 20 may further include an auxiliary cone 80 rotatably coupled to the second face 16. The auxiliary cone 80 is maintained by the engagement of the detent assembly 30 in an auxiliary cone first position at which a mating surface 81 of the primary cone 12 and a corresponding mating surface 82 of the auxiliary cone 80 are substantially adjacent to one another.

The primary cone 12 and the auxiliary cone 80 are generally similar in shape with the auxiliary cone 80 being axially shorter than the primary cone 12. Each may be tapered and each may include a substantially pointed end 90. In exemplary embodiments, however, a portion of the primary cone 12 may have a convex taper 100 while a portion of the auxiliary cone 80 may have a concave taper 101.

The detent assembly 30 may include a first detent part 110 disposed at the mating surface 81 of the primary cone 12 and a second detent part 111 disposed at the mating surface 82 of the auxiliary cone 80. The first detent part 110 may include a hooked formation 114 and the second detent part 111 may include a shoulder portion 112. The shoulder portion 112 may be impinged upon by the hooked formation 114 and is oriented to frictionally oppose a rotation direction of the primary cone 12. For example, the direction of the rotation of the primary cone 12 would have been clockwise and, as such, the shoulder portion 112 would have been overhung by the hooked formation 114 from a top-right to a bottom-left in the plane of FIG. 2. In accordance with embodiments and, as shown in FIG. 1, respective outermost surfaces 113 of the first detent part 110 and the second detent part 111 are substantially aligned with one another in accordance with the taper of the nose cone section 20.

The primary cone 12 and the auxiliary cone 80 may be rotatably coupled to the body 11 by hinges 120 and 121, respectively, either or both of which may be elastic or otherwise spring-loaded. Such spring-loading of, e.g., the auxiliary cone 80 increases the ability of the detent assembly 30 to maintain the primary cone 12 in the first position by biasing the auxiliary cone 80 in opposition to the rotation direction of the primary cone 12. As shown in FIG. 2, the auxiliary cone 80 may be biased to rotate about the second face 16 upon the disengagement of the detent assembly 30 such that, until the disengagement occurs, the friction generated between the first and second detent parts 110 and 111 is increased.

The spring-loading of the hinges 120 and 121 further increases a pressure that can be applied to the substrate by the primary cone 12 and/or the auxiliary cone 80 when the detent assembly 30 is disengaged. This pressure increases friction generated between surfaces of the primary cone 12 and/or the auxiliary cone 80 with the substrate and impedes movement of the wall anchor 10 relative to the substrate.

The trigger 40 may be actuatable by an insertion of a member 43 through the body 11 and, in particular, the first face 13. Where the member 43 is, for example, a screw on which an object can be hung on the substrate, the insertion of the member 43 may be achieved by urging the screw through the body 11 and simultaneously rotating the screw about its longitudinal axis. This insertion may be facilitated by the forming of a pilot hole in the body 11 during, for example, the original formation of the body 11, such as by injection molding or some other similar process.

The trigger 40 may be formed with a substantially cantilevered structure with a relatively elastic throat portion 41, which is coupled to a trailing end 411 of the primary cone 12, and a hammer portion 42. The hammer portion 42 may be relatively resilient and may be disposed at a distal end of the throat portion 41. As such, when the primary cone 12 is in the first position, the hammer portion 42 is aligned with the body 11 and the first face 13 and, therefore, is positioned to be impinged upon by the member 43 as the member 43 is inserted through the body 11 and the first face 13.

Once the member 43 is inserted through the body 11 and the first face 13, the member 43 impinges upon the hammer portion 42. The force applied by the member 43 may drive the primary cone 12 to move in direction A, in which case the first detent part 110 becomes disengaged in an axial direction from the second detent part 111. In other embodiments, the force of the member 43 may impart rotational momentum to the primary cone 12 that is sufficient to overcome the resistance to disengagement of the detent assembly 30. In still other embodiments, the member 43 may drive the primary cone 12 in direction A and impart the rotational momentum. In any case, the actuation of the trigger 40 resulting from the impingement thereon by the member 43 causes the detent assembly 30 to be selectively disengaged.

In some embodiments, further actuation of the trigger 40 may result from continued and/or increasing impingement force applied to the hammer portion 42 by the member 43 due to continued advancement of the member 43 through the body 11 and the first face 13. This further actuation may cause the primary cone 12 to rotate about the first face 13 following the disengagement of the detent assembly 30.

A complete actuation forces the primary cone 12 to squeeze the substrate against the flange 60. The squeezing of the substrate against the flange 60 by the primary cone 12 leads to a distribution of forces on the substrate resulting from the weight of a hanging object and resists undesirable movement thereof, such as rotation of the wall anchor 10 that results in the member 43 and/or the wall anchor 10 falling backwards out of the hole formed in the substrate. The squeezing of the substrate may be facilitated where a distance between the flange 60 and the primary cone 12 upon the complete actuation of the trigger 40 is substantially similar to or less than a width of the substrate.

In other embodiments, particularly where the primary cone 12 and/or the auxiliary cone 80 are biased to rotate upon detent assembly 30 disengagement, the member 43 may simply act as a stop-gap measure against trigger 40 de-actuation and detent assembly 30 re-engagement. Here, once the trigger 40 is actuated, the member 43 may not be advanced further through the body 11 and, instead, simply remains in a predefined axial position at which the trigger 40 is prevented from being de-actuated.

In accordance with further aspects of the invention, it is understood that the wall anchor 10 need not fully penetrate the substrate and, in fact, the primary cone 12 and/or the auxiliary cone 80 may only partially penetrate the substrate. Conversely, it is also understood that the substrate may be wider than the longitudinal length of the body 11 in which case, the rotation of the primary cone 12 may be hindered. As such, the first position of the primary cone 12 may be defined as being a position at which the nose cone structure 20 applies an initial pressure onto the substrate and the second position may be defined as being a position at which the nose cone structure 20 applies an increased pressure onto the substrate.

Here, the initial and the increased pressures are respectively associated with initial and increased frictional forces generated between surfaces of the substrate and the primary cone 12 and/or the auxiliary cone 80 of the nose cone structure 12. These frictional forces inhibit relative movement between the nose cone structure 12 and the substrate in accordance with their respective magnitudes.

The pressures and the associated friction can be increased, as mentioned above, by at least one of the hinges 120 and 121 being spring-loaded. In this case, once the detent assembly is disengaged, the spring-loading causes one or both of the primary cone 12 and the auxiliary cone 80 to tend rotate with or without further actuation of the trigger 40 by the member 43, which may then act as merely a stop-gap measure against trigger 40 de-actuation and detent assembly 30 re-engagement. This tendency to rotate is expressed in the increased pressure applied to the substrate by the nose cone structure 20.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A wall anchor, comprising:
    a nose cone structure including a body and a primary cone with a leading end and a trailing end, which is rotatably coupled to the body and manually urgeable to penetrate a substrate;
    a detent assembly, disposed on the nose cone structure, which is engageable to maintain the primary cone in a first position; and
    a trigger integrally coupled to the nose cone structure at the trailing end of the primary cone and actuatable to selectively disengage the detent assembly such that the primary cone is permissively rotatable about the body into a second position.

2. The wall anchor according to claim 1, wherein the nose cone structure is tapered from a relatively wide trailing end to the leading end, which is pointed.

3. The wall anchor according to claim 1, wherein the nose cone structure has a substantially oblong cross-section.

4. The wall anchor according to claim 1, further comprising wings disposed on at least the body.

5. The wall anchor according to claim 1, wherein the body comprises:
    a flange disposed at a trailing end thereof to abut the substrate to thereby inhibit movement of the body in the penetration direction; and
    first and second transverse faces disposed at a leading end thereof, the primary cone being rotatably coupled to the first face.

6. The wall anchor according to claim 5, wherein the flange comprises a rounded edge.

7. The wall anchor according to claim 5, further comprising an auxiliary cone rotatably coupled to the second face, which is maintained by the detent assembly engagement in a first position thereof at which respective mating surfaces of the primary and auxiliary cones are substantially adjacent.

8. The wall anchor according to claim 7, wherein profiles of the primary and auxiliary cones are convex and concave, respectively.

9. The wall anchor according to claim 7, wherein the primary and auxiliary cones both comprise pointed ends.

10. The wall anchor according to claim 7, wherein the detent assembly comprises:
    a first detent part disposed at the primary cone mating surface and including a hooked formation; and
    a second detent part disposed at the auxiliary cone mating surface and including a shoulder portion, which is impinged upon by the hooked formation and which opposes a direction of rotation of the primary cone.

11. The wall anchor according to claim 10, wherein outermost surfaces of the first and second detent parts are substantially aligned.

12. The wall anchor according to claim 1, wherein the trigger is actuatable by insertion of a member through the body.

13. The wall anchor according to claim 12, wherein a further actuation of the trigger causes the primary cone to rotate about the face of the body.

14. The wall anchor according to claim 13, wherein an axial distance between a trailing end of the body and the primary cone upon a completion of the further actuation of the trigger is substantially similar to or less than a substrate width.

15. The wall anchor according to claim 1, wherein the trigger has a substantially cantilevered structure and comprises:
    an elastic throat portion coupled to the primary cone; and
    a substantially resilient hammer portion disposed at a distal end of the throat portion.

16. The wall anchor of claim 1, wherein
    when the primary cone is in the first position the nose cone structure applies an initial pressure onto the substrate; and
    when the primary cone is in the second position the nose cone structure applies an increased pressure onto the substrate.

17. The wall anchor according to claim 16, wherein the pressures are respectively associated with friction generated between the substrate and the nose cone structure.

18. The wall anchor according to claim 16, further comprising an auxiliary cone biased to rotate upon disengagement of the detent assembly to thereby apply further pressure onto the substrate.

19. A wall anchor system, comprising:
    a nose cone structure including a body and a primary cone with a leading end and a trailing end, which is rotatably coupled to the body and manually urgeable to penetrate a substrate, a detent assembly disposed on the nose cone structure, which is engageable to maintain the primary cone in a first position and a trigger integrally coupled to the nose cone structure at the trailing end of the primary cone and actuatable to selectively disengage the detent assembly such that the primary cone is permissively rotatable into a second position; and
    a member, which is insertable through the body to impinge upon and thereby actuate the trigger, to selectively disengage the detent assembly to thereby permit rotation of the primary cone about the body into a second position.

20. The wall anchor system according to claim 19, wherein the member comprises a screw.

* * * * *